United States Patent
Klitzner et al.

(10) Patent No.: US 6,453,044 B1
(45) Date of Patent: Sep. 17, 2002

(54) USER INTERFACE FOR A PORTABLE COMMUNICATION DEVICE

(76) Inventors: Orrin Klitzner, 29 Lee Hill Rd., Andover, NJ (US) 07821; Samuel Geffen, 5 Chestnut Grove Ct., New City, NY (US) 10956

( * ) Notice: Subject to any disclaimer, the term of this patent is extended or adjusted under 35 U.S.C. 154(b) by 0 days.

(21) Appl. No.: 09/696,238
(22) Filed: Oct. 26, 2000
(51) Int. Cl.[7] ................................................ H04M 1/00
(52) U.S. Cl. ...................................................... 379/430
(58) Field of Search ................................. 379/430, 433; 381/330, 327, 328, 322, 338, 371; 455/568

(56) References Cited

U.S. PATENT DOCUMENTS

| | | | |
|---|---|---|---|
| 3,868,572 A | 2/1975 | Kaufman et al. | 325/16 |
| 3,916,312 A | 10/1975 | Campbell | 325/16 |
| 3,918,550 A * | 11/1975 | Milani | 381/330 |
| 3,993,879 A * | 11/1976 | Larkin | 379/430 |
| 4,118,606 A * | 10/1978 | Larkin | 379/430 |
| 4,335,281 A * | 6/1982 | Scott et al. | 379/430 |
| 4,620,605 A * | 11/1986 | Gore et al. | 381/338 |
| 5,287,554 A * | 2/1994 | Furuno | 379/433 |
| 5,487,182 A | 1/1996 | Hansson | 455/90 |
| 5,528,689 A | 6/1996 | Chan | 379/430 |
| 5,613,222 A | 3/1997 | Guenther | 455/89 |
| 5,642,402 A | 6/1997 | Vilmi et al. | 379/58 |
| 5,703,946 A | 12/1997 | Chen | 379/446 |
| 5,850,439 A | 12/1998 | Yang | 379/395 |
| 6,021,208 A * | 2/2000 | Kin-Lung | 381/338 |
| 6,038,330 A * | 3/2000 | Mencci, Jr. | 381/371 |
| 6,047,064 A | 4/2000 | Lyons | 379/446 |
| 6,058,184 A | 5/2000 | Frank | 379/420 |
| 6,081,594 A | 6/2000 | Tseng | 379/420 |
| 6,101,403 A | 8/2000 | Masuda | 455/569 |

* cited by examiner

*Primary Examiner*—Jack Chiang
(74) *Attorney, Agent, or Firm*—Herten, Burstein, Sheridan, Cevasco, Bottinelli & Litt, L.L.C.; Arnold D. Litt, Esq.

(57) ABSTRACT

A cellular telephone including a user communication component linking the user to the cellular telephone without the transmitting radiation leakage associated with the use of cellular telephones. The cellular telephone includes a plurality of operating components transmitting outgoing signals and receiving incoming signals. The operating components include an incoming signal output which processes incoming signals and outputs the incoming signals for the user. The telephone further includes an interface linking the operating components to a user. The interface includes a speaker coupled to the incoming signal output. The speaker amplifies and converts incoming signals from the incoming signal output to audible signals. The interface further includes a speaker sound tube linking a user to the speaker, wherein the speaker sound tube includes a first end and a second end. The first end of the speaker sound tube is coupled to the speaker for receiving audible signals generated thereby and the second end includes a user communication component through which the user may listen to the audible signals generated by the speaker.

20 Claims, 4 Drawing Sheets

USER INTERFACE FOR A PORTABLE COMMUNICATION DEVICE

BACKGROUND OF THE INVENTION

1. Field of the Invention

The invention relates to an interface device for use with cellular communication devices, for example, cellular telephones. More particularly, the present invention relates to a user interface incorporating a sound tube for transmitting sounds between a cellular telephone and a user.

2. Description of the Prior Art

Recent advances allowing wide spread use of cellular, and other portable, communication devices have not been achieved without some problems. First, it has recently been found that radiation emitted by cellular communication devices may be detrimental to users regularly bringing the communication devices in close proximity to their heads.

Second, many automobile safety groups have found a correlation between cellular communication device use and accidents. It has, therefore, been suggested by many groups that "hands free" devices be used while individuals take telephone calls on cellular communication devices. In addition, many communities, states and civic groups are pushing for legislation requiring the use of "hands free" equipment when cellular communication devices are used in automobiles.

As such, a need exists for a user interface allowing hands free use of cellular communication devices while limiting a user's exposure to potentially harmful radiation. The present invention provides such a user interface.

SUMMARY OF THE INVENTION

It is, therefore, an object of the present invention to provide a cellular telephone including a user communication component linking the user to the cellular telephone without the transmitting radiation leakage associated with the use of cellular telephones. The cellular telephone includes a plurality of operating components transmitting outgoing signals and receiving incoming signals. The operating components include an incoming signal output which processes incoming signals and outputs the incoming signals for the user. The telephone further includes an interface linking the operating components to a user. The interface includes a speaker coupled to the incoming signal output. The speaker amplifies and converts incoming signals from the incoming signal output to audible signals. The interface further includes a speaker sound tube linking a user to the speaker, wherein the speaker sound tube includes a first end and a second end. The first end of the speaker sound tube is coupled to the speaker for receiving audible signals generated thereby and the second end includes a user communication component through which the user may listen to the audible signals generated by the speaker.

It is also an object of the present invention to provide a modular interface substantially as disclosed above.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
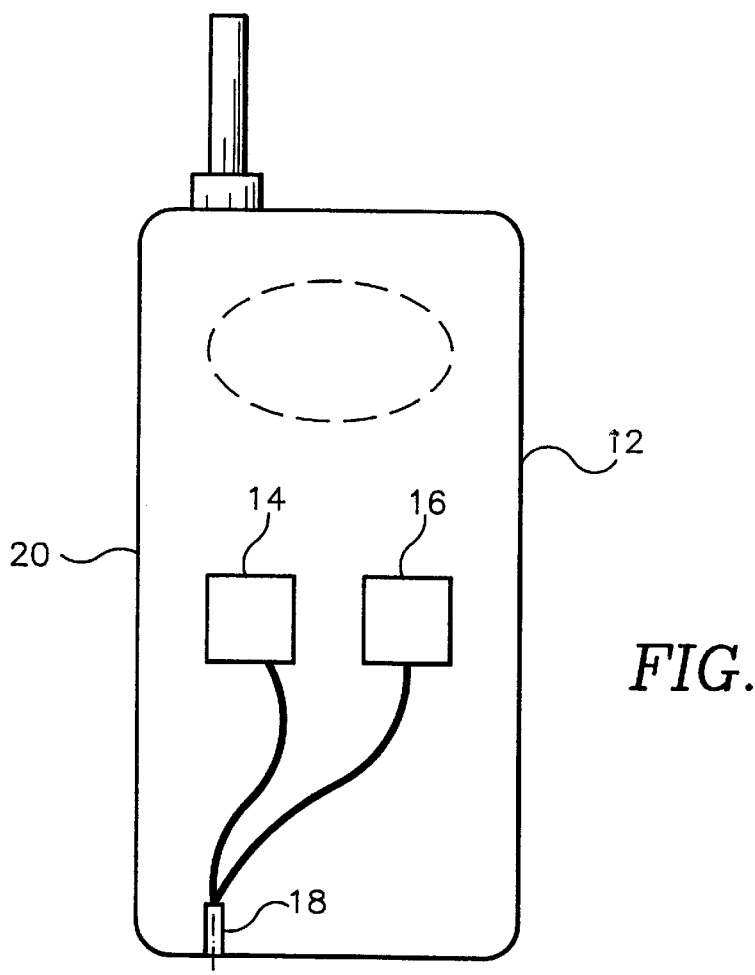
FIG. 1 is a schematic of a cellular telephone with the present interface.
Figure 2:
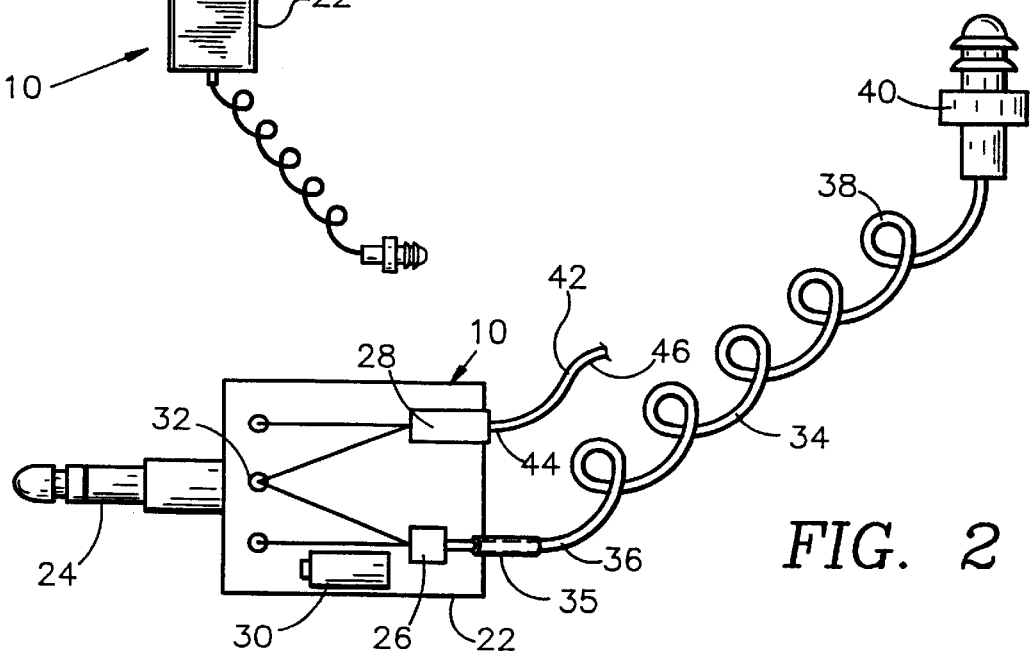
FIG. 2 is a schematic of the interface device in accordance with the present invention.

With reference to FIGS. 1 and 2, a user interface 10 adapted for selective coupling to a cellular telephone 12, or other portable communication device, is disclosed. The user interface 10 links the user to the cellular telephone 12 without transmitting radiation leakage associated with the use of cellular telephones and without requiring the user to utilize his or her hands to communicate via the cellular telephone 12.

As mentioned above, the user interface 10 is adapted for use with currently available cellular telephones 12. Such cellular telephones 12 generally include a plurality of operating components transmitting outgoing signals and receiving incoming signals. Included among these operating components are an incoming signal output 14 for outputting incoming signals for external use by the user and an outgoing signal input 16 which receives and processes outgoing signals for transmission to other individuals. The incoming signal output 14 and the outgoing signal input 16 are commonly accessed via a common jack 18 accessible externally from the housing 20 of the cellular telephone 12. While a preferred embodiment of the present invention is described herein for use with a cellular telephone 12, those skilled in the art will readily appreciate that the present invention may be applied with various communication devices without departing from the spirit of the present invention.

Referring again to FIGS. 1 and 2, the user interface 10 includes a housing 22 having an interface jack 24 adapted for electrical communication with the common jack 18 linked to the incoming signal output 14 and the outgoing signal input 16. The interface jack 24 uses conventional electrical connections known to those skilled in the art and commonly employed in the use of external speakers and microphones. While the interface jack 24 in accordance with the present invention is disclosed as electrically linking the user interface 10 to the cellular telephone 12, those skilled in the art will readily understand that other transmission techniques, for example, optical transmissions, may be employed without is departing from the spirit of the present invention.

A speaker, and more particularly, a transducer 26, is contained within the housing 22 and electrically coupled to the interface jack 24 for receipt of incoming signals emanating from the incoming signal output 14. For the purposes of the present disclosure a transducer is considered to refer to an electromechanical speaker in a sealed enclosure having an opening for receipt of a hollow tube having a 1 mm diameter. The transducers used in accordance with the present invention are much smaller than even subminiature speakers, but produce a high sound pressure level (SPL). Preferred transducers for use in accordance with the present invention are currently manufactured by Knowles, Tibbetts Industries and Microtronics. The transducer 26 amplifies and converts incoming signals from the incoming signal output 14 to produce audible signals.

Similar, a microphone 28 is contained with the housing 22 and electrically coupled to the interface jack 24 for the transmission of outgoing messages via the outgoing signal input 16. The microphone 28 amplifies and converts audible outgoing signals for transmission by the cellular telephone 12.

In an effort to conserve the batteries of the cellular telephone 12, the user interface 10 may be provided with an internal battery pack 30. The battery pack 30 is electrically linked to both the microphone 28 and the transducer 26 for driving the same during operation of the present user interface 10. The circuitry linking the battery 30, transducer 26, microphone 28 and interface jack 24 is completed by coupling the same to a ground 32. While an alternate battery pack is discussed above, the interface may also draw power from the cellular telephone in accordance with preferred embodiments of the present invention.

Finally, radiation free transmission of audible signals to the user is achieved by coupling the output of the transducer 26 to a transducer sound tube 34. In accordance with a preferred embodiment of the present invention, the transducer sound tube 34 is adhesively or frictionally bound to a male member 35 of the transducer 26. The tube 34 is preferably constructed of an elastomeric material, such as, rubber, neoprene, silicone, urethane. However, other materials may be used without departing from the spirit of the present invention. The material chosen for the tubing should be flexible, non-kinking and UV stabilized. The tubing may also offer coiling ability.

The transducer sound tube 34 links a user to the transducer 26, and ultimately to the cellular telephone 12. The transducer sound tube 34 includes a first end 36 and a second end 38. The first end 36 of the transducer sound tube 34 is coupled to the transducer 26 for receiving audible signals generated thereby and the second end 38 includes a user communication component, for example, an earpiece 40, through which the user may listen to the audible signals generated by the transducer 26. The earpiece is preferably injection molded, although it may take a variety of forms without departing from the spirit of the present invention.

Similar radiation free transmission on the microphone 28 side is achieved by coupling the input of the microphone 28 to a microphone sound tube 42. The microphone sound tube 42 links a user to the microphone 28, and ultimately to the cellular telephone 12. The microphone sound tube 42 includes a first end 44 and a second end 46. The first end 44 of the microphone sound tube 42 is coupled to the microphone 28 and the second end 46 remains free for receiving audible signals generated by the user. In accordance with a preferred embodiment of the present invention, a condenser microphone is used. The condenser microphone offers sensitivity, small size and cost effectiveness. However, other microphones may be used in accordance with the spirit of the present invention.

Both the microphone sound tube 42 and the transducer sound tube 34 are simply filled with air and rely upon the acoustics of the tube in transmitting sound waves from one end of the tube to the other. As such, none of the radiation sometimes associated with electrical transmissions is brought near the user of the cellular telephone, since the air contained within the tubes is incapable of carrying radiation as the sound waves move from one end of the tube to the other end of the tube.

Figure 3:
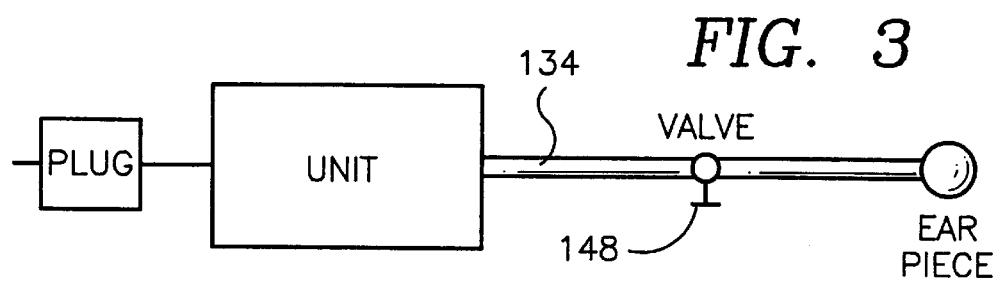
FIGS. 3–11 are schematics of various embodiments in accordance with the present invention.
Figure 3A:
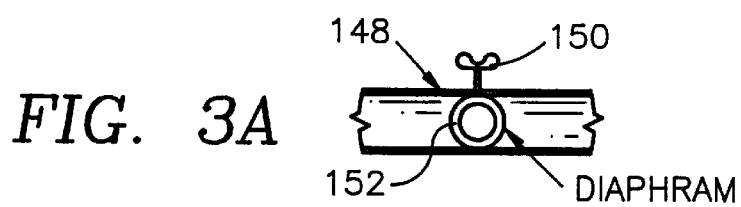

In accordance with an alternate embodiment, and with reference to FIGS. 3 and 3A, the transducer sound tube 134 may be provided with a valve 148 limiting the volume of the audible signal reaching the ear of a user. The valve 148 includes a shaft 150 couple to a diaphragm 152 positioned within the tube 134. The shaft 150 is rotated to turn the diaphragm 152 and control the sound passing through the tube 134.

Figure 4:
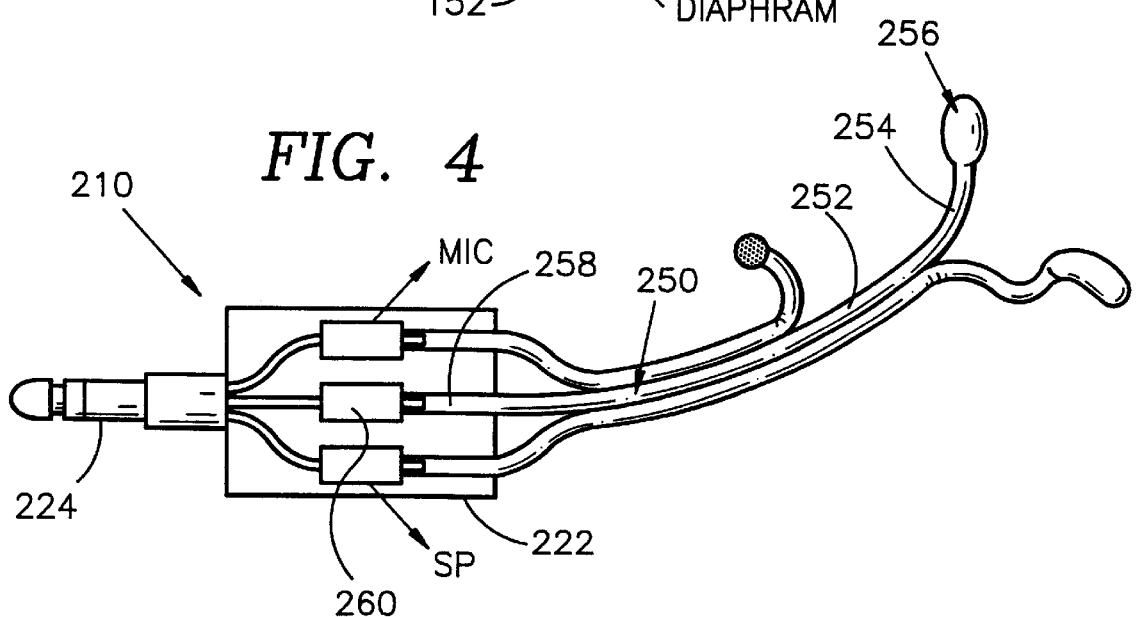

Referring to FIG. 4, the interface 210 in accordance with the present invention may be further enhanced with the provision of a pressure actuated switch tube 250 for answering the cellular telephone. The pressure actuated switch tube 250 includes a closed, pressurized tube 252 accessible to the user of the interface 210. The closed tube 252 includes a closed first end 254 which may be provided with a bulb 256 for gripping by the user. The closed second end 258 is housed within the housing 222 of the user interface 210 and is linked to a pressure sensitive switch 260. As such, when the first end 254 of the tube 252 is pressed, the pressure with the tube 252 increases and activates the pressure sensitive switch 260 located within housing 222. The pressure sensitive switch 260 then converts the pressure signal to an electrical signal which is transmitted to the cellular telephone via the interface jack 224.

Figure 5:
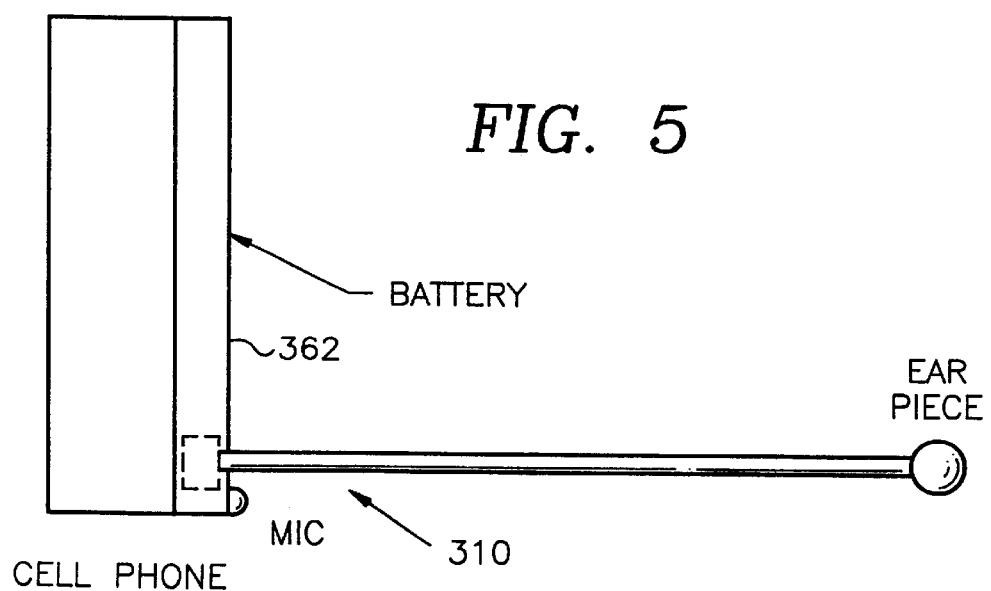

With reference to FIG. 5, a further embodiment of the present invention is disclosed. In accordance with this disclosed embodiment, the interface 310 described above, i.e., the jack, transducer and microphone, are integrally formed within a conventional battery pack 362. Since these battery packs are commonly replaceable, and have been used in conjunction with cellular telephones since the time they were originally introduced to the public, individuals using phones which do not include a jack as discussed above may still take advantage of the present system by simply replacing their existing battery pack with one including an interface in accordance with the present invention.

Figure 6:
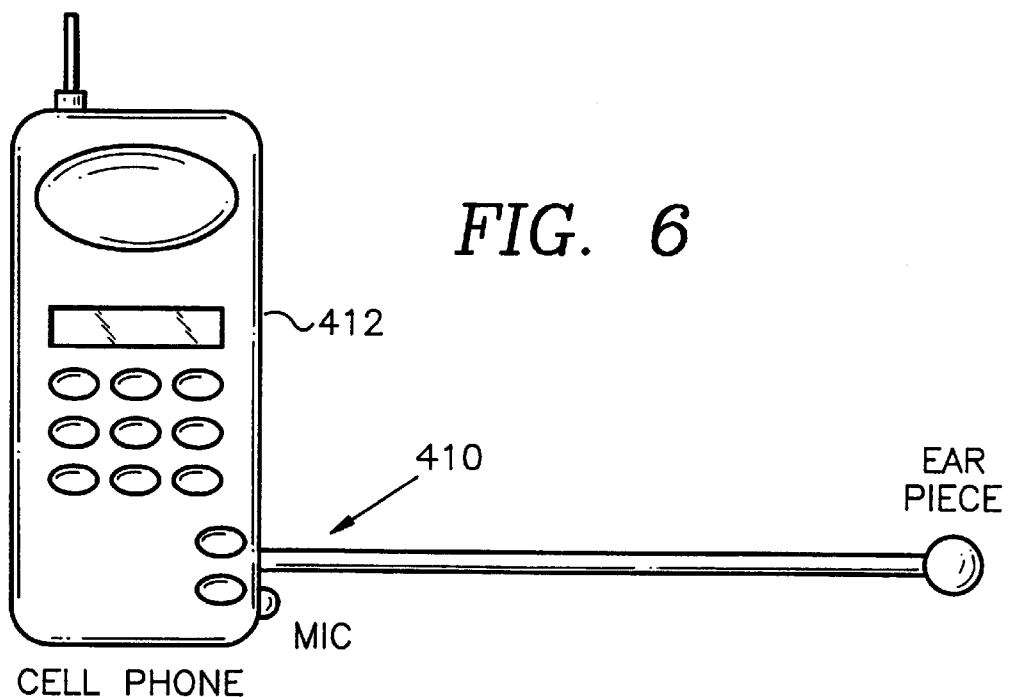

Similar, and with reference to FIG. 6, a further embodiment is disclosed in which the interface 410 is integrally formed with the cellular telephone 412. This embodiment utilizes the same components as disclosed in accordance with the embodiment of Figure -, but integrates the interface within the housing of the cellular telephone.

Figure 7:
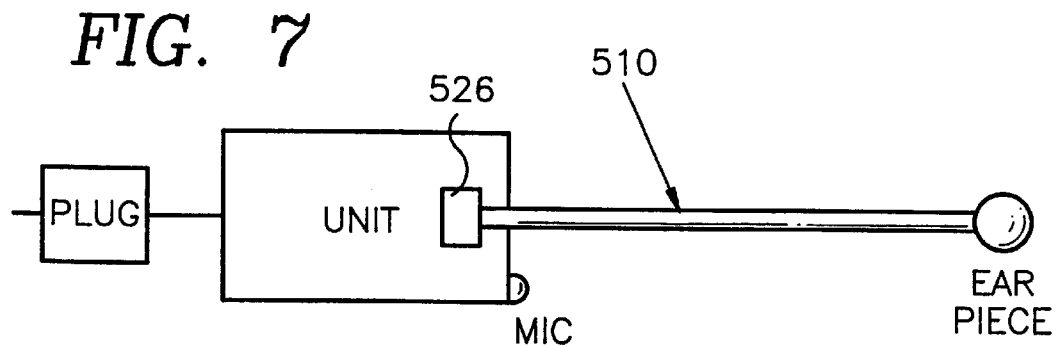

With reference to FIG. 7, because the negative effects associated with radiation exposure are more commonly associated with the transducer that may be pressed directly into contact with the user ear, the interface 510 in accordance with the present invention may be formed with only a transducer 526 and rely upon a separate structure for the microphone.

Figure 8:
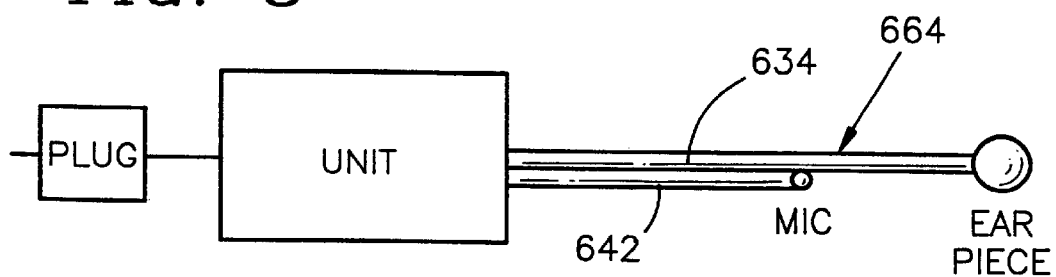

FIG. 8, discloses a further embodiment in which the microphone sound tube and the transducer sound tube are formed as a single unit 664 with separate lumen 634,642.

Figure 9:
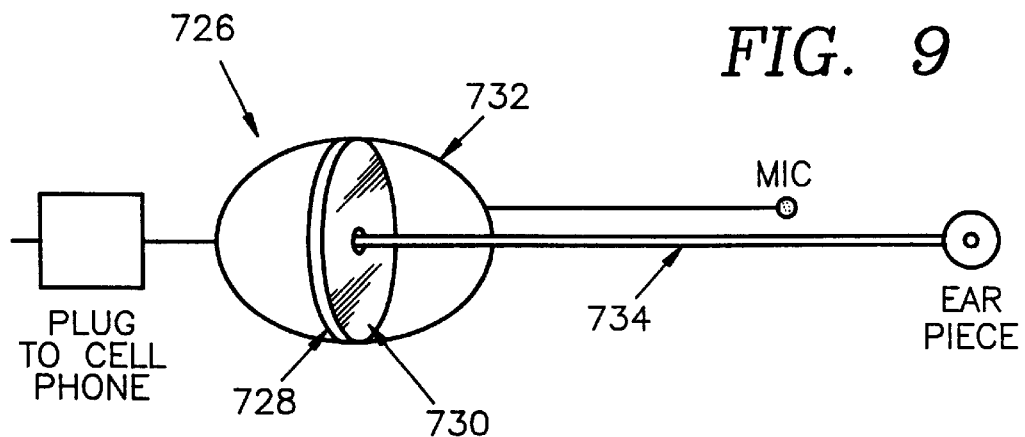

Referring to FIG. 9, an alternate speaker 726 arrangement for use in accordance with the present invention is disclosed. The speaker 726 includes a miniature driver 728 having a cover 730 secured thereto. The driver 728 and cover 730 are sealed within a container 732 and the transducer sound tube 734 is passed through the container 732 and cover 730 for access to vibrations generated by the driver 728.

Figure 10:
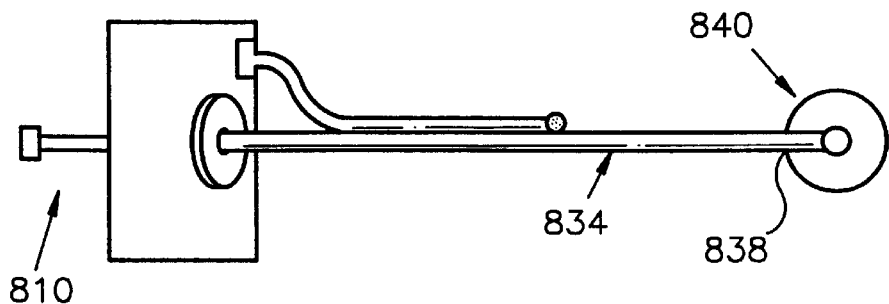
Figure 11:
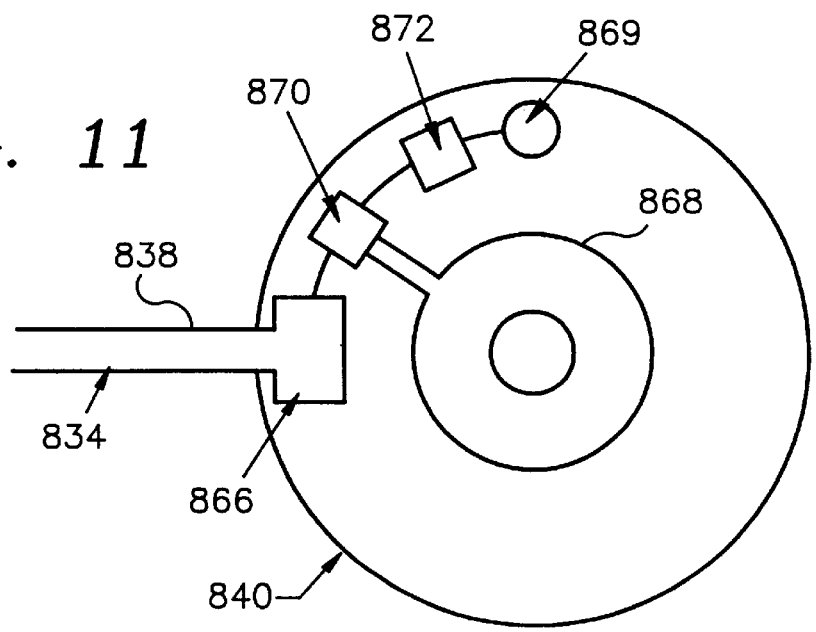

With reference to FIGS. 10 and 11, a further embodiment of the present invention is disclosed. The disclosed embodiment 810 employs a microphone 866 and speaker 868, powered by a battery 869, within the earpiece 840 to improve the sound generated by the present system. Specifically, a microphone 866 is coupled to the distal end 838 of the sound tube 834. The microphone 866 receives incoming sound from the tube 834, converts the sound to an electrical signal and transmits the same to an amplifier 870 within the earpiece 840. The amplifier then transmits an amplified signal through a volume control 872 and into the speaker 868 which converts the signal to an audible sound.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A cellular telephone including a user communication component linking the user to the cellular telephone without the transmitting radiation leakage associated with the use of cellular telephones, comprising:

a plurality of operating components transmitting outgoing signals and receiving incoming signals, the operating components including an incoming signal output which processes incoming signals and outputs the incoming signals for the user;

an interface linking the operating components to a user, the interface including:

a speaker coupled to the incoming signal output, the speaker amplifying and converting incoming signals from the incoming signal output to audible signals, wherein the speaker includes a driver which is sealed within an integral enclosure having a single opening shaped and dimensioned for receiving a speaker sound tube, the speaker further including a cover secured over the driver, and the driver and cover are sealed within the enclosure in a manner defining a front chamber and rear chamber separated by the driver and cover so as to create a high sound pressure level improving the sound received by a user, wherein the speaker sound tube passes through the cover for access to vibrations generated by the driver, the speaker sound tube linking a user to the speaker, wherein the speaker sound tube includes a first end and a second end, the first end of the speaker sound tube being coupled to the speaker for receiving audible signals generated thereby and the second end including a user communication component through which the user may listen to the signals generated by the speaker.

2. The cellular telephone according to claim 1, wherein the incoming signal output includes a jack, and the interface is selectively coupled to the jack for receiving incoming signals.

3. The cellular telephone according to claim 1, wherein the user communication component is an earpiece.

4. The cellular telephone according to claim 1, wherein the operating components further include an outgoing signal input which processes outgoing signals for transmission to other individuals, and the interface further includes a microphone amplifying and converting audible outgoing signals for transmission coupled to the outgoing signal input and a microphone sound tube linking a user to the microphone, wherein the sound tube includes a first end and a second end, the first end of the microphone sound tube being coupled to the microphone and the second end remaining free for receiving audible signals generated by the use.

5. The cellular telephone according to claim 4, wherein the incoming signal output and the outgoing signal output share a common jack, and the interface is selectively coupled to the jack for receiving incoming signals and transmitting outgoing signals.

6. The cellular telephone according to claim 1, wherein the interface includes a battery supplying power to the microphone.

7. The cellular telephone according to claim 1, wherein the interface further includes means for controlling the volume of audible signals generated by the speaker.

8. The cellular telephone according to claim 7, wherein the means for controlling is a valve positioned within the speaker sound tube.

9. The cellular telephone according to claim 1, wherein the operating components include a battery and the interface is integrally formed with the battery.

10. The cellular telephone according to claim 1, wherein interface is integrally associated with the operating components.

11. The cellular telephone according to claim 1, wherein the interface includes a battery supplying power to the speaker.

12. An interface selectively coupled to a cellular telephone for linking the user to the cellular telephone without transmitting radiation leakage associated with the use of cellular telephones, the cellular telephone includes a plurality of operating components transmitting outgoing signals and receiving incoming signals, the operating components including a incoming signal output jack for outputting incoming signals for external use by the user, the interface comprising:

a housing having a interface jack shaped and dimensioned for selective receipt within the incoming signal output jack;

a speaker contained within the housing and linked to the interface jack, the speaker amplifying and converting incoming signals from the incoming signal output jack to audible signals, wherein the speaker includes a driver which is sealed within in an integral enclosure having a single opening shaped and dimensioned for receiving a speaker sound tube, the speaker further including a cover secured over the driver, and the driver and cover are sealed within the enclosure in a manner defining a front chamber and rear chamber separated by the driver and cover so as to create a high sound pressure level improving the sound received by a user, wherein the speaker sound tube passes though the cover for access to vibrations generated by the driver, the speaker sound tube linking a user to the speaker, wherein the speaker sound tube includes a first end and a second end, the first end of the speaker sound tube being coupled to the speaker for receiving audible signals generated thereby and the second end including a user communication component through which the user may listen to the audible signals generated by the speaker.

13. The interface according to claim 12, wherein the interface jack is electrically coupled to the incoming signal output jack.

14. The interface according to claim 12, wherein the user communication component is an earpiece.

15. The interface according to claim 12, wherein the operating components of the cellular telephone further include an outgoing signal input jack which receives and processes outgoing signals for transmission to other individuals, and the interface further includes a microphone amplifying and converting audible outgoing signals for transmission coupled to the outgoing signal input jack and a microphone sound tube linking a user to the microphone, wherein the microphone sound tube includes a first end and a second end, the first end of the microphone sound tube being coupled to the microphone and the second end remaining free for receiving audible signals generated by the use.

16. The interface according to claim 15, wherein the interface includes a battery supplying power to the microphone.

17. The interface according to claim 12, wherein the interface further includes means for controlling the volume of audible signals generated by the speaker.

18. The interface according to claim 17, wherein the means for controlling is a valve positioned within the speaker sound tube.

19. The interface according to claim 12, wherein the interface is integrally formed with a cellular telephone battery that is selectively coupled to the cellular telephone.

20. The interface according to claim 12, wherein the interface includes a battery supplying power to the speaker.

* * * * *